(12) United States Patent
Oberai et al.

(10) Patent No.: US 11,861,286 B2
(45) Date of Patent: Jan. 2, 2024

(54) SEGREGATING DEFECTS BASED ON COMPUTER-AIDED DESIGN (CAD) IDENTIFIERS ASSOCIATED WITH THE DEFECTS

(71) Applicant: Synopsys, Inc., Mountain View, CA (US)

(72) Inventors: Ankush B. Oberai, Fremont, CA (US); Kiran U. Agashe, Mumbai (IN)

(73) Assignee: Synopsys, Inc., Sunnyvale, CA (US)

( * ) Notice: Subject to any disclaimer, the term of this patent is extended or adjusted under 35 U.S.C. 154(b) by 152 days.

(21) Appl. No.: 17/362,085

(22) Filed: Jun. 29, 2021

(65) Prior Publication Data

US 2021/0406441 A1 Dec. 30, 2021

Related U.S. Application Data

(60) Provisional application No. 63/046,425, filed on Jun. 30, 2020.

(51) Int. Cl.
*G06F 30/398* (2020.01)
*G06F 30/27* (2020.01)
*G06F 30/394* (2020.01)
*G06F 30/392* (2020.01)
*G06F 119/02* (2020.01)

(52) U.S. Cl.
CPC ............ *G06F 30/398* (2020.01); *G06F 30/27* (2020.01); *G06F 30/392* (2020.01); *G06F 30/394* (2020.01); *G06F 2119/02* (2020.01)

(58) Field of Classification Search
CPC ...... G06F 30/398; G06F 30/27; G06F 30/392; G06F 30/394; G06F 2119/02; G06T 7/0004; G06T 2207/10061
See application file for complete search history.

(56) References Cited

U.S. PATENT DOCUMENTS

| | | | | |
|---|---|---|---|---|
| 7,283,659 | B1 * | 10/2007 | Bakker | G06T 7/0004 382/145 |
| 9,053,259 | B1 * | 6/2015 | Gennari | G06F 30/398 |
| 9,092,846 | B2 * | 7/2015 | Wu | G01N 21/8851 |
| 9,858,658 | B2 * | 1/2018 | Kaizerman | G06T 7/001 |
| 9,865,512 | B2 * | 1/2018 | Jayaraman | H01L 22/12 |
| 10,204,290 | B2 * | 2/2019 | Yong | G06V 10/764 |
| 10,943,048 | B2 * | 3/2021 | Nojima | H01L 22/12 |
| 11,238,579 | B2 * | 2/2022 | Fang | G05B 19/406 |
| 11,334,982 | B2 * | 5/2022 | Peng | G06T 7/0004 |
| 2007/0288219 | A1 * | 12/2007 | Zafar | G03F 1/84 703/14 |
| 2012/0027285 | A1 * | 2/2012 | Shlain | G06F 18/2431 382/149 |
| 2012/0131529 | A1 * | 5/2012 | Hayakawa | G01N 21/8851 716/112 |

(Continued)

*Primary Examiner* — Nha T Nguyen
(74) *Attorney, Agent, or Firm* — Park, Vaughan, Fleming & Dowler LLP; Laxman Sahasrabuddhe

(57) ABSTRACT

For each defect in a set of defects, the defect may be associated with a defect attribute constructed from a set of computer-aided design (CAD) identifiers associated with polygons in an integrated circuit (IC) design that overlap with a defect area of the defect. Next, the set of defects may be segregated into defect groups based on the associated defect attributes. The defect groups may be used to perform additional processing on the set of defects.

18 Claims, 7 Drawing Sheets

(56) References Cited

U.S. PATENT DOCUMENTS

| | | | |
|---|---|---|---|
| 2013/0279790 A1* | 10/2013 | Kaizerman | G06T 7/001 382/144 |
| 2013/0279791 A1* | 10/2013 | Kaizerman | G06T 7/0004 382/145 |
| 2016/0163035 A1* | 6/2016 | Chang | G06N 3/045 382/149 |
| 2017/0344695 A1* | 11/2017 | Uppaluri | G03F 7/7065 |
| 2018/0143248 A1* | 5/2018 | Desineni | G01R 31/3177 |
| 2020/0003700 A1* | 1/2020 | Sofer | G01N 21/9501 |
| 2020/0125695 A1* | 4/2020 | Shao | G06N 3/0418 |
| 2020/0226742 A1* | 7/2020 | Sawlani | H01L 21/67288 |
| 2020/0334446 A1* | 10/2020 | Fang | G06T 7/0004 |
| 2021/0343001 A1* | 11/2021 | Grama | G06T 3/4053 |

\* cited by examiner

SEGREGATING DEFECTS BASED ON COMPUTER-AIDED DESIGN (CAD) IDENTIFIERS ASSOCIATED WITH THE DEFECTS

RELATED APPLICATION

This application claims the benefit of U.S. Provisional Application Ser. No. 63/046,425, filed on 30 Jun. 2020, the contents of which are herein incorporated by reference in their entirety for all purposes.

TECHNICAL FIELD

The present disclosure relates to integrated circuit (IC) design, manufacturing, and testing. More specifically, this disclosure relates to segregating defects based on computer-aided design (CAD) identifiers associated with the defects.

BACKGROUND

The number of defects reported by wafer inspection tools has increased sharply due to the dramatic increase in integration densities. Reviewing a large number of defects can be impractical.

SUMMARY

Embodiments described herein may feature techniques and systems for segregating defects based on CAD identifiers associated with the defects. For each defect in a set of defects, the defect may be associated with a defect attribute constructed from a set of CAD identifiers associated with polygons in an IC design that overlap with a defect area of the defect. Next, the set of defects may be segregated into defect groups based on the associated defect attributes. The defect groups may be used to perform additional processing on the set of defects.

In some embodiments, the set of CAD identifiers includes a set of cell identifiers that include polygons that overlap with the defect area. In some embodiments, the set of CAD identifiers includes one or more cell identifiers in conjunction with one or more region identifiers that include polygons that overlap with the defect area. In some embodiments, the set of CAD identifiers includes a set of net identifiers that include polygons that overlap with the defect area. In some embodiments, the set of CAD identifiers includes one or more net identifiers in conjunction with one or more region identifiers that include polygons that overlap with the defect area.

In some embodiments, segregating the set of defects into defect groups based on the associated defect attributes includes using a machine learning (ML) clustering technique.

In some embodiments, using the defect groups to perform additional processing on the set of defects includes sampling defects for further review based on defect groups.

In some embodiments, using the defect groups to perform additional processing on the set of defects includes analyzing defects in a given defect group to identify a root cause for the defects in the given defect group.

In some embodiments, using the defect groups to perform additional processing on the set of defects includes identifying a hotspot pattern associated with a defect group. In some embodiments, the hotspot pattern may be used to identify additional hotspot locations in the IC design. In some embodiments, the hotspot pattern may be used to filter defects.

BRIEF DESCRIPTION OF THE FIGURES

The disclosure can be understood based on the detailed description given below and the accompanying figures. The figures are for illustrative purposes, and do not limit the scope of the disclosure. Furthermore, the figures are not necessarily drawn to scale.

DETAILED DESCRIPTION

Figure 1:
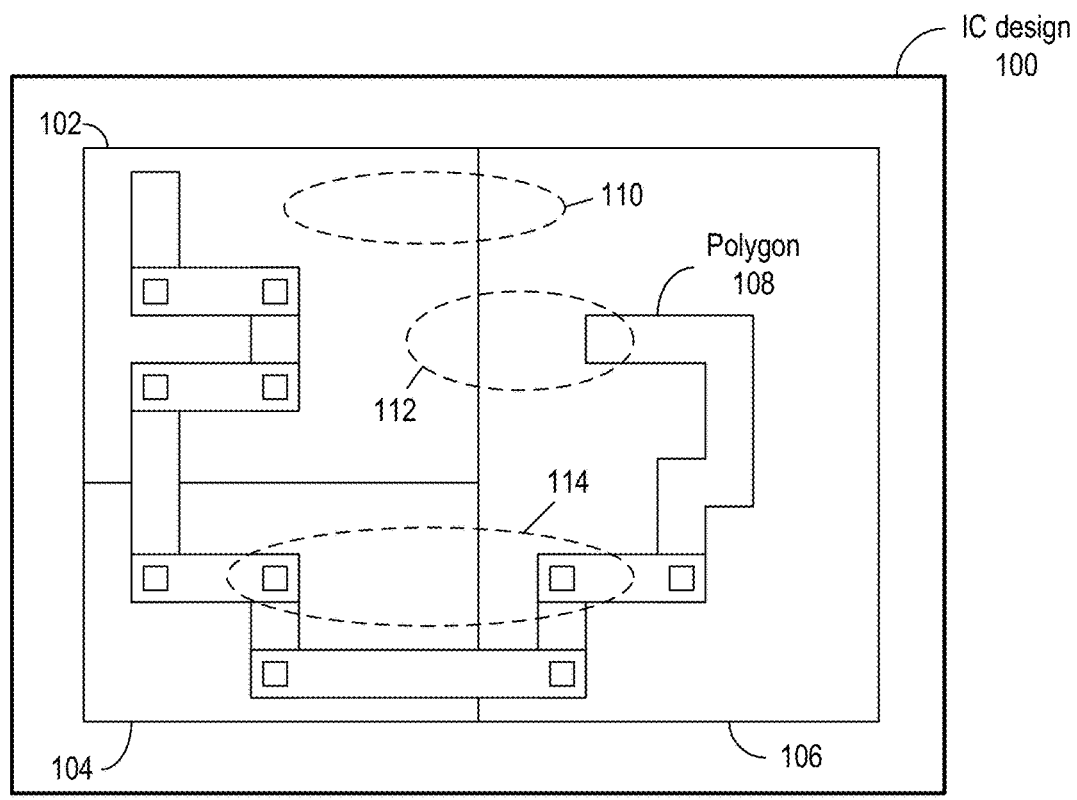
FIG. 1 illustrates associating a defect with an attribute that is based on one or more cell identifiers in accordance with some embodiments described herein.

During semiconductor manufacturing, a wafer may progress through multiple processing stages. The results after one or more processing stages may be inspected using wafer inspection tools. Wafer inspection tools may capture an image of the wafer, and then use image processing techniques to detect defects. In this disclosure, the term "defect" may refer to a deviation (which is greater than a tolerance amount) between a printed pattern on a wafer and a design intent, and which is detected by a wafer inspection tool. For example, if a space is supposed to exist between two layout shapes in the design intent, and the wafer inspection tool detects that no space exists between the corresponding printed shapes, then the wafer inspection tool may indicate that a defect exists at the location where the space was expected.

Defects reported by a wafer inspection tool may be categorized as real defects or false positives. A real defect is a reported defect that causes the IC to malfunction or not meet the desired performance goals, whereas a false positive is a reported defect that can be ignored because it does not impact the functionality or performance of the IC in any meaningful way.

At small technology nodes, a large number of the defects reported by a wafer inspection tool can be false positives. Typically, the inspection step is followed by a review step that uses tools like a scanning electron microscope (SEM) to verify if a reported defect is a real defect, and to help uncover possible causes of real defects. Only a small percentage of reported defects can be sent for SEM review due to time and resource constraints (SEM equipment is very costly, and SEM review is a time-consuming step). If most of the reported defects are false positives, then the process of identifying the real defects and uncovering the root causes of the real defects can become difficult and slow.

Approaches that use polygonal pattern matching can be too slow and inefficient for binning millions of incoming defects. Additionally, to achieve enough information to perform a defect-to-layout correlation, an extremely large number of samples may need to be reviewed. This can lead to a low throughput from the review process or to a low yield in the absence of a comprehensive review.

Embodiments described herein provide systems and techniques for an effective and efficient process for inline defect segregation and sampling so that the identified defects can be considered for review. Benefits of embodiments described herein include, but are not limited to, (1) combating the problems of high false alarm rate of inspection defects and the difficulty in uncovering underlying root causes of real defects, (2) reducing the amount of resources used for determining root causes for defects, and (3) improving the manufacturing yield.

Optical inspection tools can overlay the physical layout structures from the design data with the silicon image. This information can help one understand as to whether the defect under review overlaps with a critical structure in the physical layout. If so, then the tool can mark the critical structure for review. Specifically, after the inspection step in semiconductor manufacturing, defects are typically reported by using inspection tools. The defects are typically reported with their location on the wafer and their size. Coordinates of wafer are usually translated to corresponding coordinates in the CAD coordinate system.

An IC's physical layout may be represented by a hierarchical set of layout cells. Each layout cell may include polygons and/or one or more child cells. Defects in semiconductor manufacturing may be caused by specific geometric positioning of polygons. The specific geometric positioning of polygons can, in turn, be due to relative instantiation of layout cells. A set of defects may be assigned the same attribute identifier if the set of defects overlap the same set of layout cells. The attribute identifiers may then be used to group similar defects.

FIG. 1 illustrates associating a defect with an attribute that is based on one or more cell identifiers in accordance with some embodiments described herein.

IC design 100 may include layout cells 102, 104, and 106. Each layout cell may include multiple polygons, e.g., polygon 108. Each polygon may refer to a physical structure in an IC chip, and the squares at the junction of two polygon may refer to a contact or a via between the two polygons. Each defect may be associated with a defect area. For example, defects D1, D2, and D3 may be associated with defect areas 110, 112, and 114, respectively, which are shown as dashed ovals in FIG. 1.

In some embodiments described herein, overlap may be detected between the defect area associated with a defect and polygons belonging to one or more cells. Next, the defect may be associated with an attribute that is constructed based on identifiers of a set of cells that contain the overlapping polygons. For example, defect D2 is associated with defect area 112, which overlaps with polygon 108. Polygon 108 is in layout cell 106. Thus, defect D2 may be associated with an attribute that is based on an identifier for layout cell 106. Defect D3 is associated with defect area 114, which overlaps with polygons belonging to cells 104 and 106. Thus, defect D3 may be associated with an attribute that is based on identifiers for layout cells 104 and 106. Finally, defect D1 does not overlap with any polygons. Thus, defect D1 may be associated with a null identifier and ignored because it is not expected to cause any manufacturing problems in the IC chip.

Layout cell areas may be substantially larger than a typical defect area. For example, if cell hierarchies are merged into a parent cell, then the parent cell may have a large size when compared to the defect areas. If attributes are constructed based on cell identifiers as described in reference to FIG. 1, then multiple unrelated defects may be associated with the same attribute when layout cells are much larger than typical defect areas.

Some embodiments described herein can partition large cells into multiple regions and assign each region a unique identifier. Next, for a given defect, an overlap may be detected between the defect area and one or more polygons of one or more cells. The regions with the cells that contain the overlapping polygons may then be identified. Next, the defect may then be associated with an attribute that is based on the cell identifiers and the region identifiers that contain the overlapping polygons.

In some embodiments described herein, a layout cell size threshold may be used to determine whether to partition the cell into regions. Specifically, if the area of a layout cell is greater than the layout cell size threshold, then the layout cell may be partitioned into multiple regions so that each region is less than or equal to the layout cell size threshold. In some embodiments described herein, a threshold number of polygons in a layout cell may be used to determine whether to partition the layout cell. Specifically, if the number of polygons in a layout cell is greater than the threshold number of polygons, then the layout cell may be partitioned into multiple regions. Otherwise, if the number of polygons in the layout cell is less than or equal to the threshold number of polygons, then the layout cell may not be partitioned into multiple regions. Once a cell has been partitioned into multiple regions, each region may be assigned a unique identifier. Next, a particular region within a particular layout cell may be uniquely referenced using a combination of the layout cell identifier and the region identifier. For example, a unique identifier for a region within a cell may be formed by concatenating the layout cell identifier and the region identifier (with optionally a separator character in between).

Figure 2:
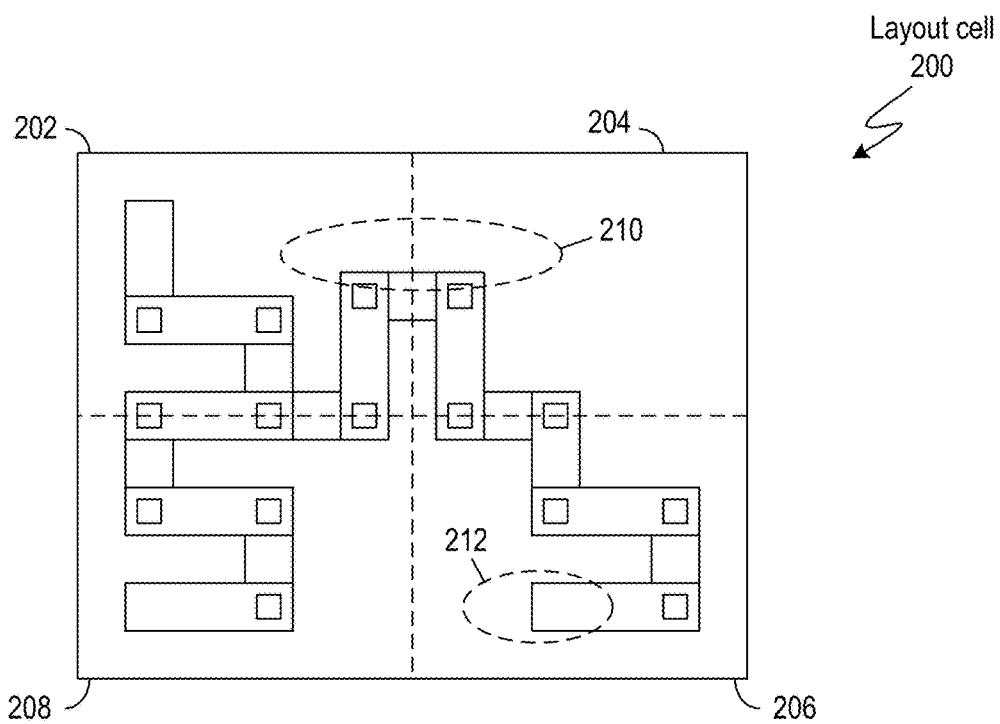
FIG. 2 illustrates associating a defect with an attribute that is based on one or more cell identifiers and one or more region identifiers in accordance with some embodiments described herein.

FIG. 2 illustrates associating a defect with an attribute that is based on one or more cell identifiers and one or more region identifiers in accordance with some embodiments described herein.

Layout cell 200 may be partitioned into regions 202, 204, 206, and 208. A defect with defect area 210 overlaps with polygons in regions 202 and 204 of layout cell 200. This defect may be associated with an attribute that is based on the cell identifier for layout cell 200 and the region identifiers for regions 202 and 204. Likewise, a defect with defect area 212 overlaps with a polygon in region 206 of layout cell 200. This defect may be associated with an attribute that is based on the cell identifier for layout cell 200 and region identifier for region 206.

The extracted CAD based attribute may not be limited to the attributes derived from the physical layout. In some embodiments, attributes that define high level circuit design constructs associated with a defect may also be used. For example, attributes of a netlist that are associated with a defect may also be used.

Specifically, in some embodiments, internal layout nets may be used to segment the layout cells into logically identifiable groups. Internal layout nets may also be used to represent relative positioning of polygons within a layout cell. In an IC design layout, polygons from multiple layers may overlap with each other through vias to form electrical connections. A set of electrically connected polygons may be referred to as a net. An internal layout net may refer to a set of electrically connected polygons within a layout cell. When a layout cell is instantiated in different areas of an IC chip, these internal layout nets may be printed in the same fashion. Thus, the set of internal layout nets that overlaps with a defect area may be used to construct a defect attribute.

Internal layout nets may be identified using multiple techniques. In one technique, if a layout versus schematic (LVS) mapping is available, then labels for layout nets may be directly used from the LVS mapping. In another technique, if an LVS mapping is not available, then the net may be traced by using layer connectivity information, which is sometimes referred to as an online trace. Next, internal layout nets formed by the online trace may be assigned a unique identifier, e.g., based on the position of lower left corner of the trace with respect to the layout cell extent, and then using actual coordinates of polygons of the net to handle collisions with other layout nets having the same lower left corner.

Figure 3:
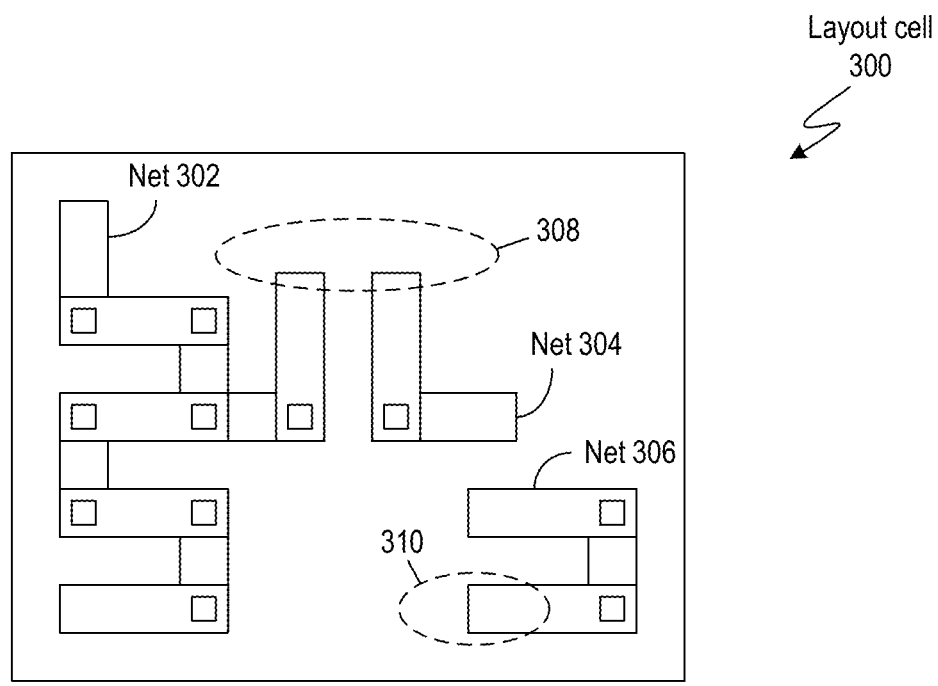
FIG. 3 illustrates associating a defect with an attribute that is based on one or more net identifiers in accordance with some embodiments described herein.

FIG. 3 illustrates associating a defect with an attribute that is based on one or more net identifiers in accordance with some embodiments described herein.

Layout cell 300 may include nets 302, 304, and 306. As shown in FIG. 3, each net may include multiple electrically connected polygons. A defect with defect area 308 overlaps with polygons in nets 302 and 304 of layout cell 300. This defect may be associated with an attribute that is based on the net identifiers for nets 302 and 304. Likewise, a defect with defect area 310 overlaps with a polygon in net 306 of layout cell 300. This defect may be associated with an attribute that is based on the net identifier for net 306.

Figure 4:
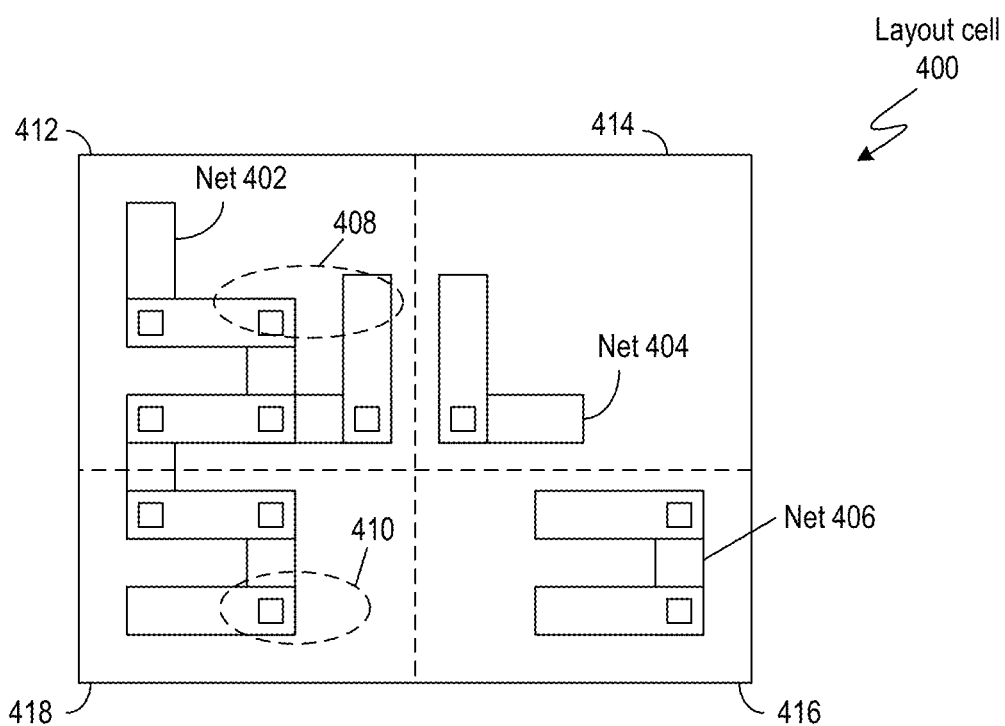
FIG. 4 illustrates associating a defect with an attribute that is based on one or more net identifiers and one or more layout cell region identifiers in accordance with some embodiments described herein.

FIG. 4 illustrates associating a defect with an attribute that is based on one or more net identifiers and one or more layout cell region identifiers in accordance with some embodiments described herein.

If the internal layout nets are larger than the defect area, some embodiments may use layout cell region identifiers along with net identifiers to construct an attribute for the defect. For example, layout cell 400 may include nets 402, 404, and 406. Further, layout cell 400 may be partitioned into regions 412, 414, 416, and 418, and each region may be assigned a unique identifier. A defect with defect area 408 overlaps with polygons in net 402 in region 412 of layout cell 400. Thus, this defect may be associated with an attribute that is based on the net identifier for net 402 and the region identifier for region 412. On the other hand, a defect with defect area 410 overlaps with polygons in net 402 in region 418 of layout cell 400. Thus, this defect may be associated with an attribute that is based on the net identifier for net 402 and the region identifier for region 418.

In some embodiments described herein, a bounding box for a net may be partitioned into multiple regions, and each region may be assigned a unique identifier. Next, a combination of the net identifier and the region identifier may be used to construct an attribute for a defect.

Figure 5:
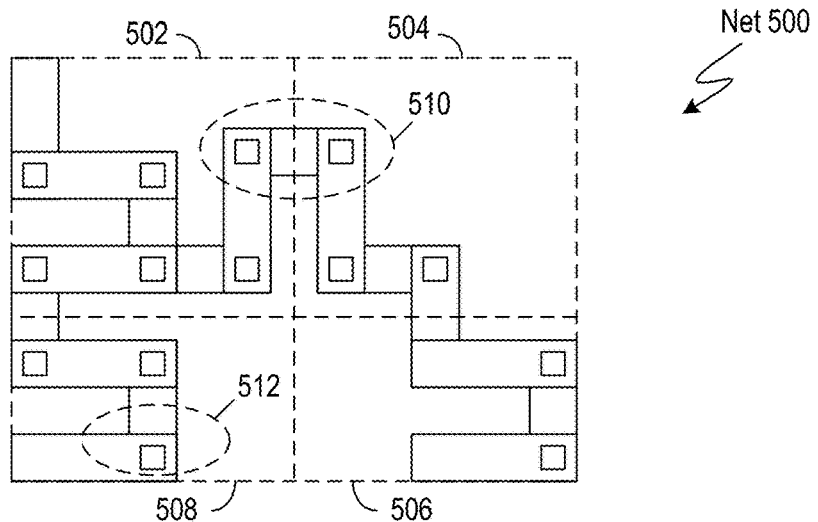
FIG. 5 illustrates associating a defect with an attribute that is based on one or more net identifiers and one or more net region identifiers in accordance with some embodiments described herein.

FIG. 5 illustrates associating a defect with an attribute that is based on one or more net identifiers and one or more net region identifiers in accordance with some embodiments described herein.

The bounding box around net 500 may be partitioned into net regions 502, 504, 506, and 508. Next, some embodiments may use net region identifiers along with net identifiers to construct an attribute for the defect. For example, a defect with defect area 510 overlaps with polygons in net 500 in net regions 502 and 504. Thus, this defect may be associated with an attribute that is based on the net identifier for net 500 and region identifiers for regions 502 and 504. On the other hand, a defect with defect area 512 overlaps with polygons in net 500 in region 508. Thus, this defect may be associated with an attribute that is based on the net identifier for net 500 and the region identifier for region 508.

Embodiments described herein may generally extract any CAD identifiers corresponding to semiconductor manufacturing defects. Defects arising from common root causes may have matching or similar values for one or more extracted CAD identifiers. The CAD identifiers may be obtained from cell information, instance hierarchy information, layout polygon connectivity, netlist information, and moment of polygons. Examples of CAD identifiers include, but are not limited to, a cell identifier (e.g., CELL_A), a net identifier (e.g., NET_A), a region identifier (e.g., REG_1). In some embodiments, the CAD identifiers for the defects may be used to construct defect attributes, and the defect attributes may be used to partition the defects into groups by using machine learning (ML) based clustering techniques. Examples of defect attributes include, but are not limited to, a set of cell identifiers, a set of net identifiers, a set of region identifiers, or a combination thereof (e.g., "{CELL_A, CELL_B, CELL_C}," "{CELL_A(REG_1), CELL_B (REG_1,REG_2)}"). Some embodiments described herein may maintain a database of defect attributes. If a database entry does not exist for an incoming defect, then a new attribute may be created for the defect and stored in the database.

Figure 6A:
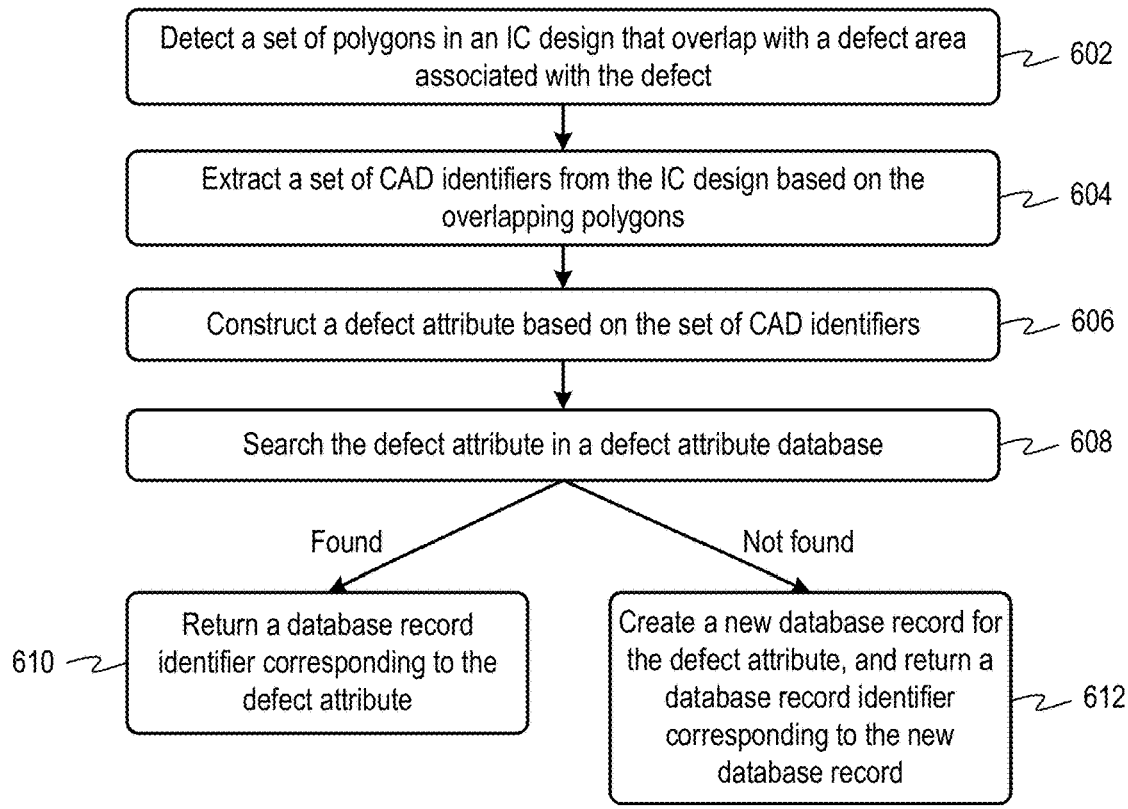
FIG. 6A illustrates a process for creating an attribute for a defect in accordance with some embodiments described herein.

FIG. 6A illustrates a process for creating an attribute for a defect in accordance with some embodiments described herein.

A set of polygons in an IC design that overlap with a defect area associated with the defect may be detected (at 602). Next, a set of CAD identifiers may be extracted from the IC design based on the overlapping polygons (at 604). A defect attribute may be constructed based on the set of CAD identifiers (at 606). Next, the defect attribute may be searched in a defect attribute database (at 608). If the defect attribute is found in the database, then a database record identifier corresponding to the defect attribute may be returned (at 610). On the other hand, if the defect attribute is not found in the database, a new database record for the defect attribute may be created, and a database record identifier corresponding to the new database record may be returned (at 612).

In some embodiments, the database search may perform an exact match. In some embodiments, the database search may match for a threshold percentage of identifiers. A percentage-based match may be helpful to catch common critical areas across multiple defects that have failing polygon constructs. Specifically, matching a percentage of identifiers may allow ignoring the rest of the non-critical polygonal constructs and match for critical recurring organization of polygons by virtue of matching critical subset of layout cells. For example, assume that the percentage match in a configuration is set at 80%. Additionally, in this example, the following defect attributes may be present in the database:

Attr #1={CELL_A, CELL_B, CELL_C, CELL_D, CELL_E}

Attr #2={CELL_A, CELL_B, CELL_E, CELL_F, CELL_G}

Next, a defect may be received with identifiers {CELL_A, CELL_C, CELL_D, CELL_E}. In this case, some embodiments may match the defect with attribute "Attr #1" because 80% of the identifiers match (i.e., four out of five identifiers match). This approximation can help the embodiment ignore polygon structures that do not correspond to a root cause. In some embodiments, the percentage threshold for matching defect attributes may be set by a user.

Figure 6B:
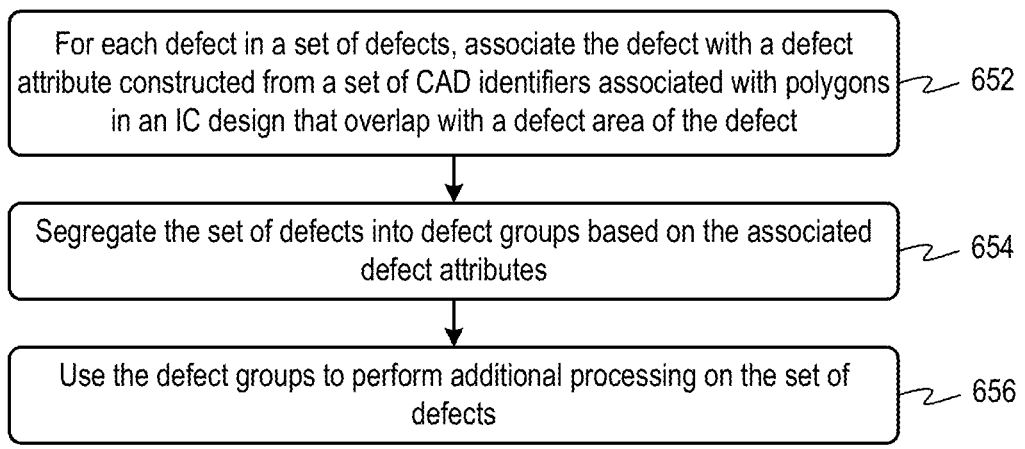
FIG. 6B illustrates a process for segregating defects based on CAD identifiers associated with the defects in accordance with some embodiments described herein.

FIG. 6B illustrates a process for segregating defects based on CAD identifiers associated with the defects in accordance with some embodiments described herein.

For each defect in a set of defects, the defect may be associated with a defect attribute constructed from a set of CAD identifiers associated with polygons in an IC design that overlap with a defect area of the defect (at 652). For example, embodiments shown in FIGS. 1-6A may be used to construct a defect attribute and maintain a database of defect attributes. Specifically, the set of CAD identifiers may include a set of cell identifiers that include polygons that overlap with the defect area. In some embodiments, the set of CAD identifiers may include one or more cell identifiers in conjunction with one or more region identifiers that include polygons that overlap with the defect area. In some embodiments, the set of CAD identifiers may include a set of net identifiers that include polygons that overlap with the defect area. In some embodiments, the set of CAD identifiers may include one or more net identifiers in conjunction with one or more region identifiers that include polygons that overlap with the defect area.

Next, the set of defects may be segregated into defect groups based on the associated defect attributes (at 654). In some embodiments, an ML clustering technique may be used to segregate the set of inspection defects into the defect groups.

The defect groups may then be used to perform additional processing on the set of defects (at 656). Examples of additional processing on the set of defects may include, but is not limited to, (1) sampling defects for further review based on defect groups associated with the inspection defects, (2) analyzing defects in a given defect group to identify a root cause for the defects in the given defect group, (3) identifying a hotspot pattern associated with a defect group, (4) using the hotspot pattern to identify additional hotspot locations in the IC chip, and (5) using the hotspot pattern to filter defects.

Figure 7:
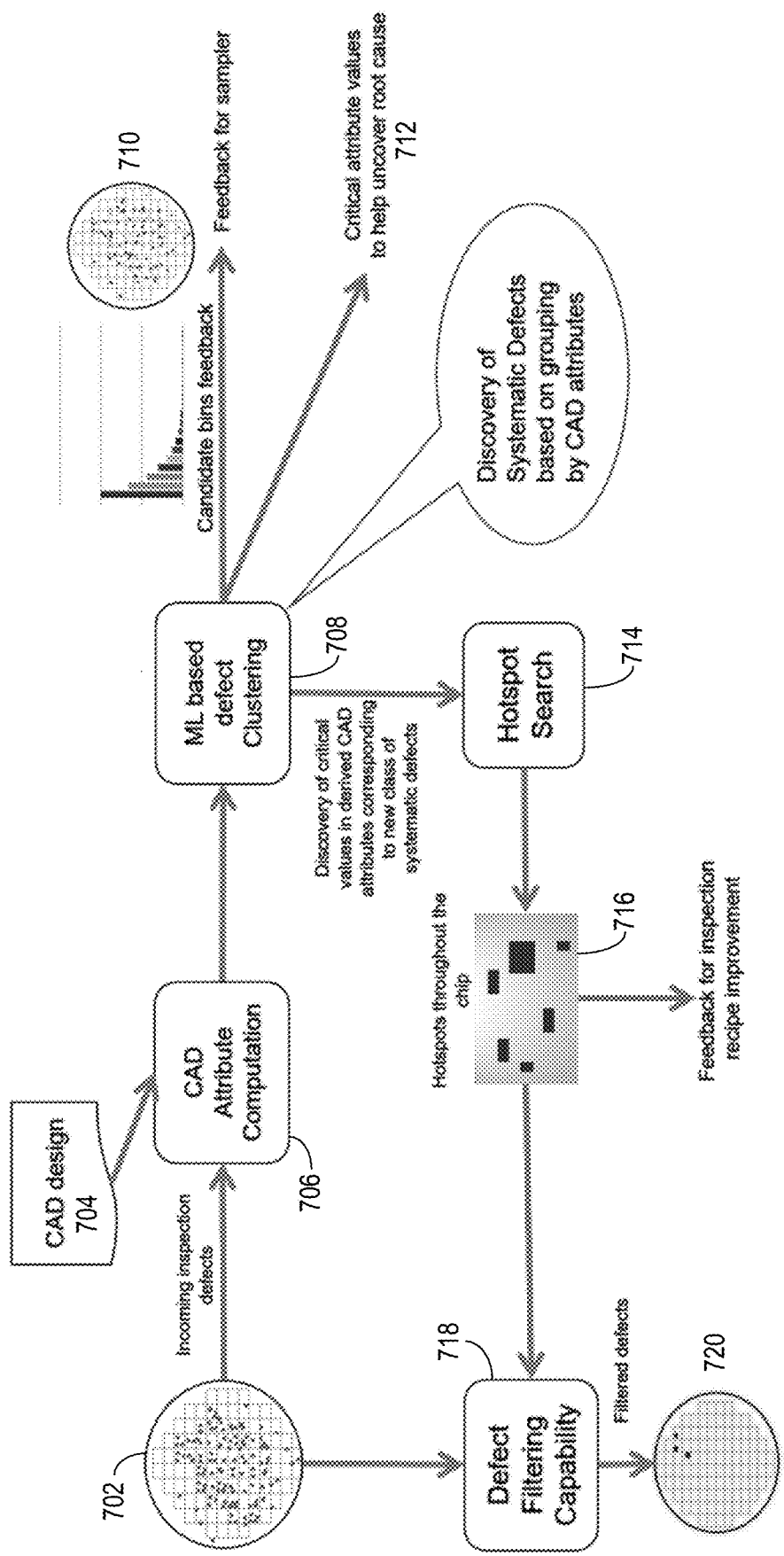
FIG. 7 illustrates a flow for segregating defects into defect groups and using the defect groups to perform further processing in accordance with some embodiments described herein.

FIG. 7 illustrates a flow for segregating defects into defect groups and using the defect groups to perform further processing in accordance with some embodiments described herein. A set of defects can be identified on a wafer (702). The CAD design 704 can be used to compute CAD identifiers (706) for the defects. In some embodiments, ML clustering 708 can be used to group the defects into different groups. Next, the groups can be used for various applications including, but not limited to, sampling for further review 710, root cause analysis 712, and for identifying hotspots 714.

Each defect may be represented as a point in a multidimensional space, where each type of CAD identifier associated with the defect may correspond to a distinct dimension. An ML clustering technique may determine clusters of points that are near each other and farther away from other points. Some ML clustering techniques are shown below:

| Method Name | Parameters | Use Case | Geometry (Metric Used) |
|---|---|---|---|
| K-Means | number of clusters | General-purpose, even cluster size, flat geometry, not too many clusters | Distances between points |
| Affinity propagation | damping, sample preference | Many clusters, uneven cluster size, non-flat geometry | Graph distance (e.g. nearest-neighbor graph) |
| Mean-shift | bandwidth | Many clusters, uneven cluster size, non-flat geometry | Distances between points |
| Spectral clustering | number of clusters | Few clusters, even cluster size, non-flat geometry | Graph distance (e.g. nearest-neighbor graph) |
| Ward hierarchical clustering | number of clusters or distance threshold | Many clusters, possibly connectivity constraints | Distances between points |
| Agglomerative clustering | number of clusters or distance threshold, linkage type, distance | Many clusters, possibly connectivity constraints, non Euclidean distances | Any pairwise distance |
| DBSCAN | neighborhood size | Non-flat geometry, uneven cluster sizes | Distances between nearest points |
| OPTICS | minimum cluster membership | Non-flat geometry, uneven cluster sizes, variable cluster density | Distances between points |
| Gaussian mixtures | many | Flat geometry, good for density estimation | Mahalanobis distances to centers |
| Birch | branching factor, threshold, optional global clusterer. | Large dataset, outlier removal, data reduction. | Euclidean distance between points |

The hotspot identification 714 can be used to identify hotspots throughout the IC chip (716) and can also be used to filter defects. For example, defect filtering capability 718 can be used to obtain a substantially smaller set of defects 720.

Some embodiments may be used to find similar defects, which may help to sample defects for review effectively. Specifically, defect groups with a larger number of defects may be sampled with higher priority as they are likely to be more systematic. After a given defect group with a high defect population is sampled and found to have a real/false alarm defect ratio that is greater than a threshold value, no more defects may be sampled from the given defect group because it is unlikely that any additional real defects that are identified in the defect group will provide any new information for determining the root cause of the real defects. Sampling priority may be assigned to defect groups, and the number of defects sampled from a given defect group may be based on the defect group. Specifically, more defects may be sampled from higher priority defect groups. Sampling priority may be increased for defect groups with next higher defect counts until a real defect threshold or a false alarm threshold is reached. In this manner, embodiments described herein can make the review process more efficient and can improve the overall yield of chip manufacturing.

Some embodiments described herein may be used for filtering incoming inspection defects based on their associated CAD identifiers. Specifically, defect attributes corresponding to real defects may be referred to as critical defect attributes. Critical defect attributes may be used to search an IC chip area for locations that are likely to include real defects. These areas may be referred to as hotspots and may be used to predict classification of future incoming inspection defects.

Some embodiments described herein may be used for assisting in uncovering new defect root causes. Critical defect attributes can be used to infer underlying root causes of the defects during failure analysis.

Some embodiments described herein enable effective SEM review. Defects under the same group and having the same or similar CAD identifiers would exhibit similar root causes. So, if enough number of defects within a defect group, say beyond customizable threshold value, turn out to be real or nuisance defects, then the rest of the defects may be predicted as real or nuisance defects, respectively. This helps in deciding the choice of samples to select for review. Defects from distinct defect groups that are related by set of CAD identifier values may be used to uncover potential root causes leading to more effective review cycles and improving overall yield of the manufacturing process.

Some embodiments may aid the discovery of "systematicness" of defects and help determine the root causes of defects. CAD identifier values related to systematic defects have valuable insights about possible root causes behind the defects. For example, consider the identifier associated with proximity of metal lines. If certain group of defects are found to be always failing, and most of the defects have a similar value for the "proximity of metal lines" identifier, then one can infer that the defects might be caused due to the proximity of metal lines, and this is root cause may be confirmed by further investigations.

Some embodiments may aid the search for probable hotspots and filtering incoming inspection defects. If defects from a given group turn out to be mostly real defects or mostly nuisance defects (with customizable thresholds), then entire chip may be searched for presence of identifier values corresponding to the group. These chip areas matching the specific identifier values may be referred to as hotspots.

Some embodiments may aid the search for matching areas in chip layout for specific CAD identifier values. After the defect review, defects can be categorized either as real defects or false alarms. If specific identifier values are found to be recurring across real defects, then the entire chip can be searched for presence of areas with these CAD identifier values. These areas can be referred to as hotspots and can be used for quick filtering or classification of defects coming out of inspection.

Figure 8:
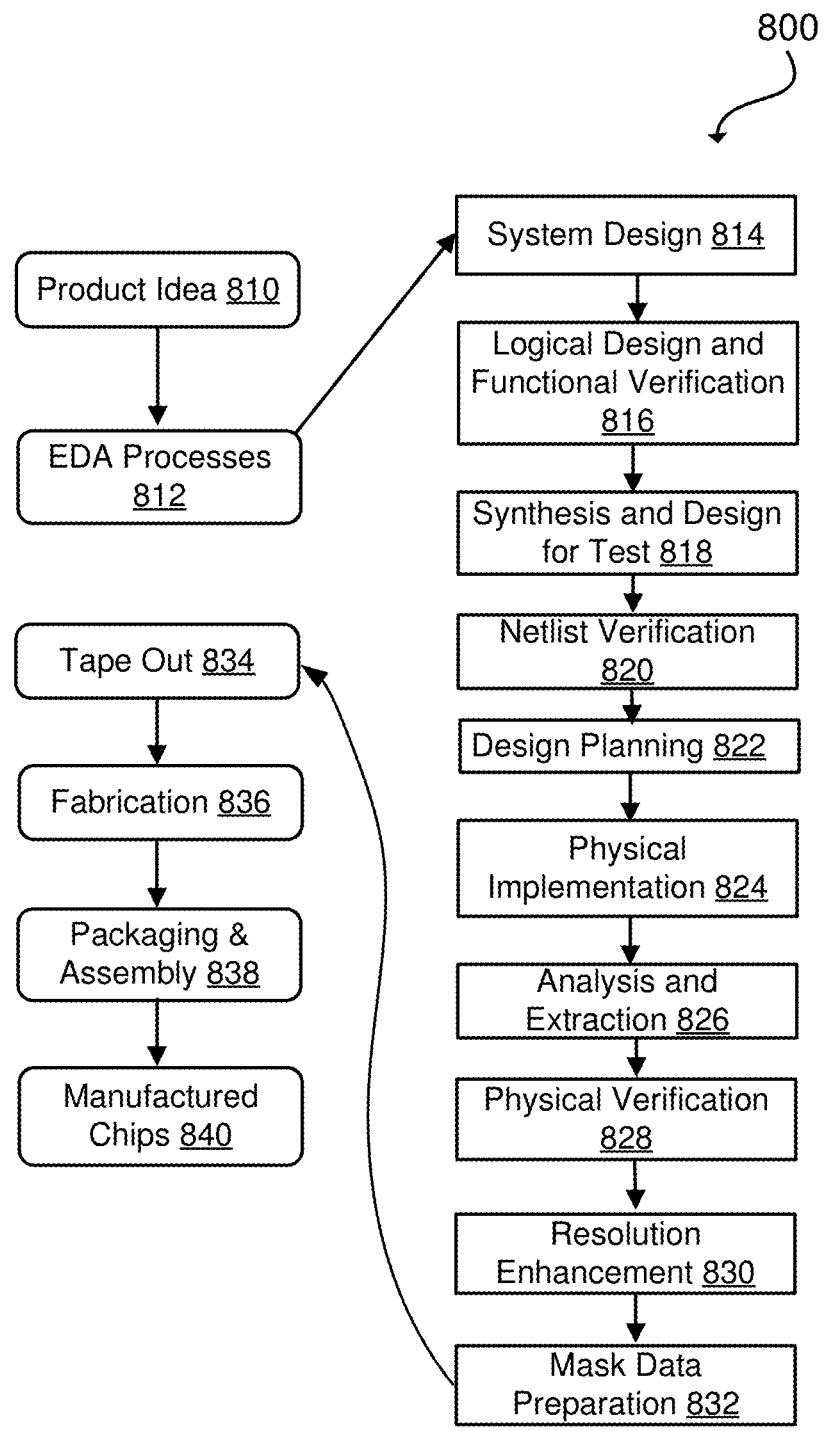
FIG. 8 illustrates an example set of processes used during the design, verification, and fabrication of an article of manufacture such as an integrated circuit to transform and verify design data and instructions that represent the integrated circuit.

FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' EDA can use one or more CAD tools. These processes start with the creation of a product idea 810 with information supplied by a designer, information which is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed to produce the finished integrated circuit 840.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more concrete description adds more useful detail into the design description, for example, more details for the modules that include the description. The lower levels of representation that are more concrete descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 8. The processes described by be enabled by EDA products (or tools).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

Figure 9:
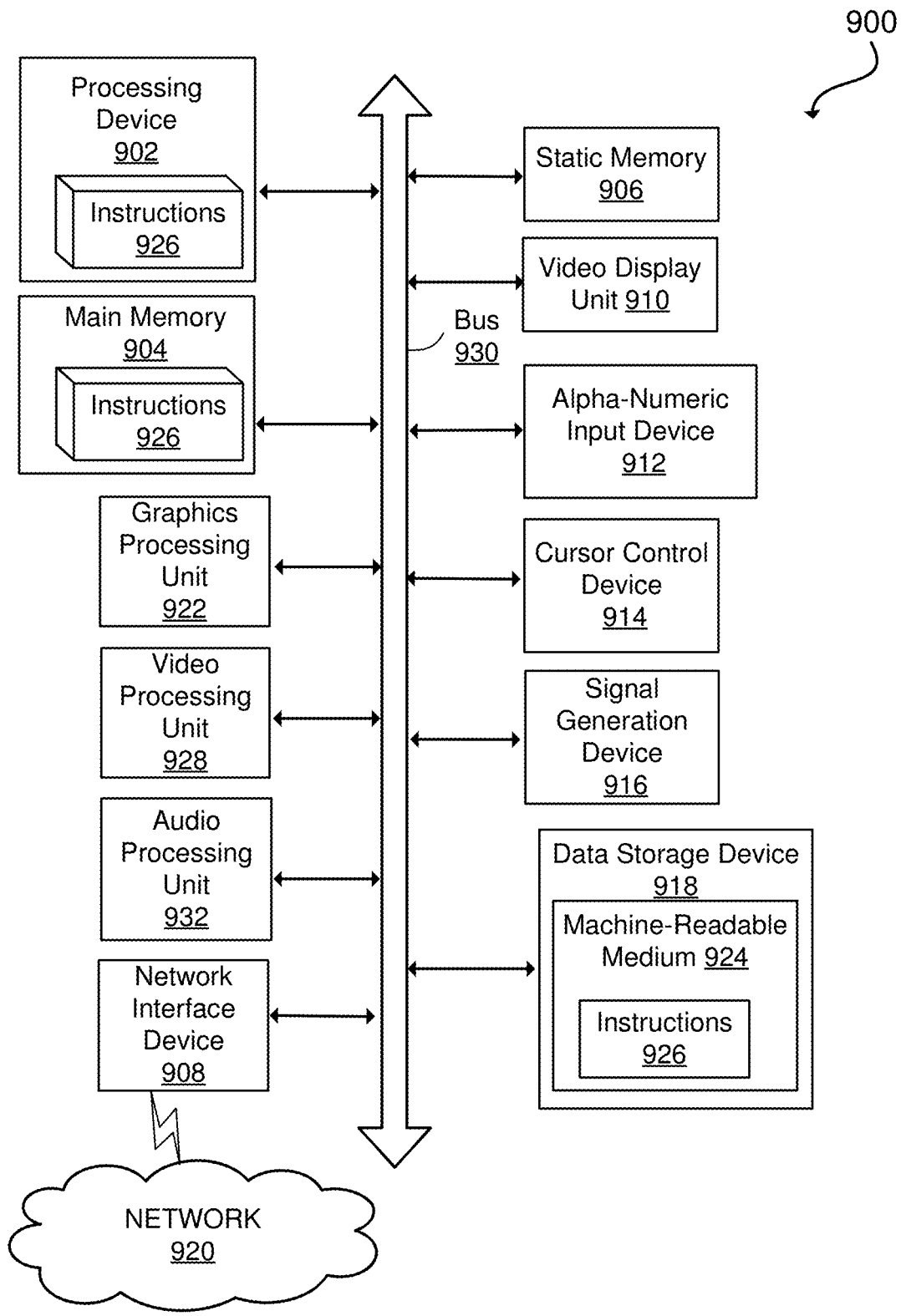
FIG. 9 illustrates an example machine of a computer system within which a set of instructions, for causing the machine to perform any one or more of the methodologies discussed herein, may be executed.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    for each defect in a set of defects, associating the defect with a defect attribute constructed from a set of computer-aided design (CAD) identifiers associated with polygons in an integrated circuit (IC) design that overlap with a defect area of the defect;
    segregating, by a processor, the set of defects into defect groups based on the associated defect attributes, wherein segregating the set of defects into defect groups based on the associated defect attributes comprises using a machine learning (ML) clustering technique; and
    using the defect groups to perform additional processing on the set of defects, wherein the additional processing comprises analyzing defects in a given defect group to identify a root cause for the defects in the given defect group.

2. The method of claim 1, wherein the set of CAD identifiers includes a set of cell identifiers that include polygons that overlap with the defect area.

3. The method of claim 1, wherein the set of CAD identifiers includes one or more cell identifiers in conjunction with one or more region identifiers that include polygons that overlap with the defect area.

4. The method of claim 1, wherein the set of CAD identifiers includes a set of net identifiers that include polygons that overlap with the defect area.

5. The method of claim 1, wherein the set of CAD identifiers includes one or more net identifiers in conjunction with one or more region identifiers that include polygons that overlap with the defect area.

6. The method of claim 1, wherein using the defect groups to perform additional processing on the set of defects comprises sampling defects for further review based on defect groups.

7. The method of claim 1, wherein using the defect groups to perform additional processing on the set of defects comprises identifying a hotspot pattern associated with a defect group.

8. The method of claim 7, further comprising using the hotspot pattern to identify additional hotspot locations in the IC design.

9. The method of claim 7, further comprising using the hotspot pattern to filter defects.

10. A non-transitory computer-readable storage medium comprising stored instructions, which when executed by a processor, cause the processor to:
    for each defect in a set of defects, associate the defect with a defect attribute constructed from a set of computer-aided design (CAD) identifiers associated with polygons in an integrated circuit (IC) design that overlap with a defect area of the defect;
    segregate the set of defects into defect groups based on the associated defect attributes, wherein segregating the set of defects into defect groups based on the associated defect attributes comprises using a machine learning (ML) clustering technique; and
    use the defect groups to perform additional processing on the set of defects.

11. The non-transitory computer-readable storage medium of claim 10, wherein the set of CAD identifiers includes a set of cell identifiers that include polygons that overlap with the defect area.

12. The non-transitory computer-readable storage medium of claim 11, wherein the set of CAD identifiers includes one or more cell identifiers in conjunction with one or more region identifiers that include polygons that overlap with the defect area.

13. The non-transitory computer-readable storage medium of claim 11, wherein the set of CAD identifiers includes a set of net identifiers that include polygons that overlap with the defect area.

14. The non-transitory computer-readable storage medium of claim 11, wherein the set of CAD identifiers includes one or more net identifiers in conjunction with one or more region identifiers that include polygons that overlap with the defect area.

15. The non-transitory computer-readable storage medium of claim 11, wherein using the defect groups to perform additional processing on the set of defects comprises sampling defects for further review based on defect groups.

16. The non-transitory computer-readable storage medium of claim 11, wherein using the defect groups to perform additional processing on the set of defects comprises analyzing defects in a given defect group to identify a root cause for the defects in the given defect group.

17. The non-transitory computer-readable storage medium of claim 11, wherein using the defect groups to perform additional processing on the set of defects comprises identifying a hotspot pattern associated with a defect group.

18. A system comprising:
a memory storing instructions; and
a processor, coupled with the memory and to execute the instructions, the instructions when executed cause the processor to:
    for each defect in a set of defects,
        detect polygons in an integrated circuit (IC) design that overlap with a defect area of the defect,
        extract a set of computer-aided design (CAD) identifiers associated with the polygons,
        construct a defect attribute based on the CAD identifiers, and
        associate the defect with the defect attribute;
    use a machine learning (ML) clustering technique to segregate the set of defects into defect groups based on the associated defect attributes; and
use the defect groups to perform additional processing on the set of defects.

\* \* \* \* \*